US009567861B2

(12) United States Patent
Congratel et al.

(10) Patent No.: US 9,567,861 B2
(45) Date of Patent: Feb. 14, 2017

(54) TURBOMACHINE VANE COOPERATING WITH A VANE RETENTION DISK

(71) Applicant: SNECMA, Paris (FR)

(72) Inventors: Sebastien Congratel, La Brosse Montceaux (FR); Raphael Dupeyre, Levallois-Perret (FR); Guillaume Klein, Mery sur Oise (FR); David Mathieu, Chelles (FR); Ba-Phuc Tang, Cergy Saint Christophe (FR); Denis Gabriel Trahot, Herblay (FR)

(73) Assignee: SNECMA, Paris (FR)

( * ) Notice: Subject to any disclaimer, the term of this patent is extended or adjusted under 35 U.S.C. 154(b) by 369 days.

(21) Appl. No.: 14/249,851

(22) Filed: Apr. 10, 2014

(65) Prior Publication Data
US 2014/0308134 A1 Oct. 16, 2014

(30) Foreign Application Priority Data

Apr. 11, 2013 (FR) ...................................... 13 53309

(51) Int. Cl.
F01D 5/30 (2006.01)
F01D 5/14 (2006.01)
F01D 11/00 (2006.01)

(52) U.S. Cl.
CPC ............. *F01D 5/3015* (2013.01); *F01D 5/147* (2013.01); *F01D 5/3007* (2013.01); *F01D 11/006* (2013.01); *F05D 2240/30* (2013.01); *F05D 2250/70* (2013.01); *Y02T 50/671* (2013.01); *Y02T 50/673* (2013.01)

(58) Field of Classification Search
CPC ...... F01D 5/3015; F01D 5/147; F01D 5/3007; F01D 11/006; Y02T 50/671; Y02T 50/673
See application file for complete search history.

(56) References Cited

U.S. PATENT DOCUMENTS 4,527,952 A * 7/1985 Forestier ................. F01D 5/323
                                                        416/220 R
2007/0036656 A1* 2/2007 Kang ...................... F01D 5/147
                                                        416/204 R (Continued)

FOREIGN PATENT DOCUMENTS

DE    102009007664    8/2010
DE    102011055150    5/2012
EP       1 624 157    2/2006

OTHER PUBLICATIONS

Search Report and Written Opinion as issued for French Patent Application No. 1353309, dated Dec. 18, 2013.

*Primary Examiner* — Jessica Cahill
(74) *Attorney, Agent, or Firm* — Pillsbury Winthrop Shaw Pittman LLP

(57) ABSTRACT

A turbomachine vane for cooperating with a vane retention disk including a plurality of peripheral teeth, the vane including a shank including a neck and a bulb for cooperating with a socket of the disk so as to radially hold the shank in the socket, the socket being a space bounded by two successive teeth of the disk, a pole on top of the neck, including two side walls facing the active surface side of the vane and two side walls facing the passive surface side of the vane, each wall having a rib at a lower end of the pole, the rib extending in the direction of the side wall facing the wall and providing a function of holding the vane when the vane is retained in the disk.

6 Claims, 3 Drawing Sheets

(56) References Cited

U.S. PATENT DOCUMENTS

| | | | | |
|---|---|---|---|---|
| 2010/0166562 A1* | 7/2010 | Boyer | ............ | F01D 5/3007 416/219 R |
| 2010/0189562 A1* | 7/2010 | Blanchard | ......... | B29D 99/0025 416/219 R |
| 2012/0107125 A1* | 5/2012 | Reghezza | ............ | F01D 5/3007 416/220 R |
| 2013/0195665 A1* | 8/2013 | Snyder | ............ | F01D 5/22 416/174 |
| 2014/0093390 A1* | 4/2014 | Pointon | ............ | F01D 5/186 416/97 R |

* cited by examiner

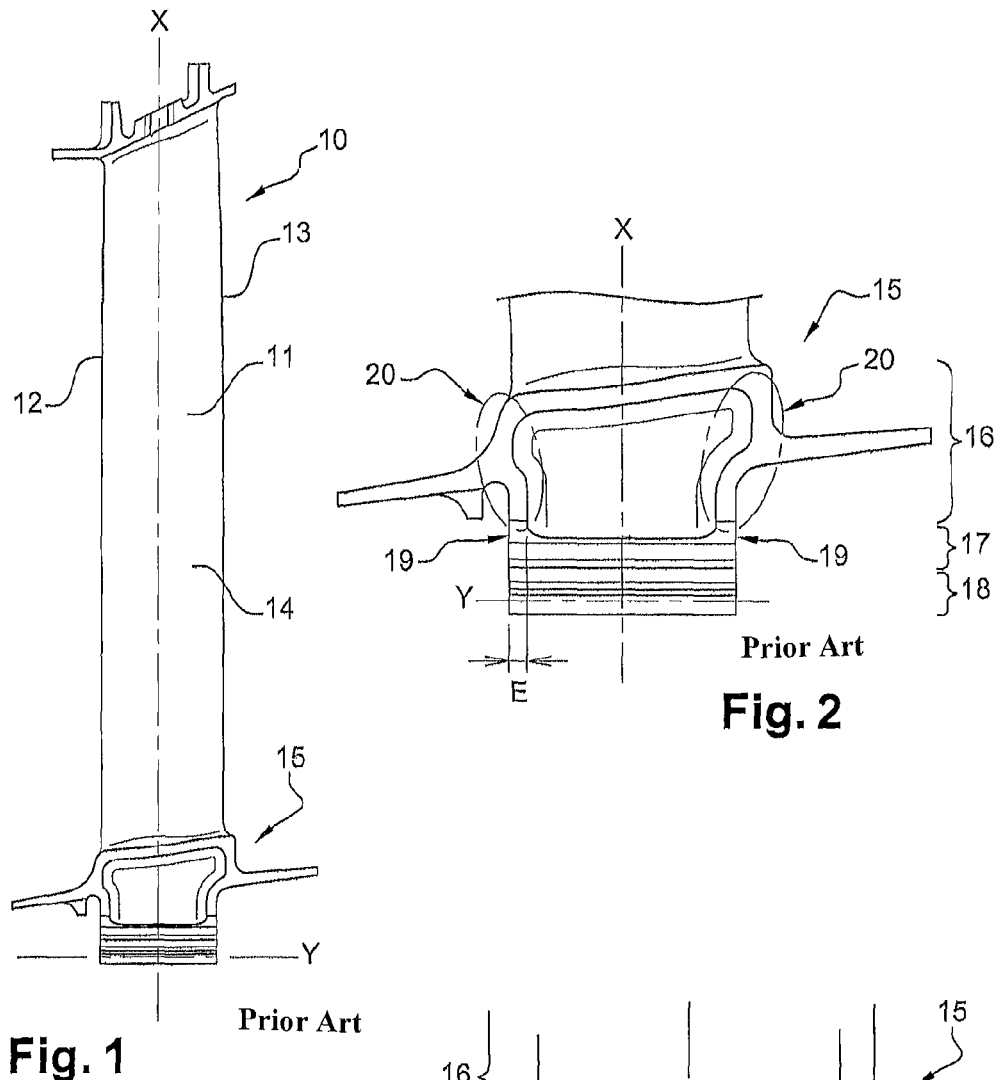
Fig. 1 Prior Art
Fig. 2 Prior Art
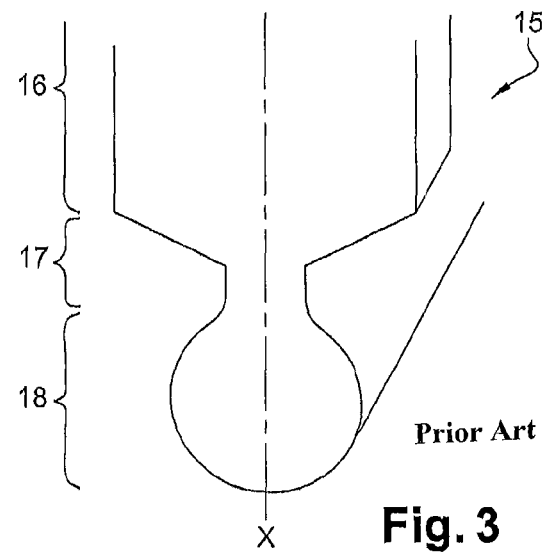
Fig. 3 Prior Art

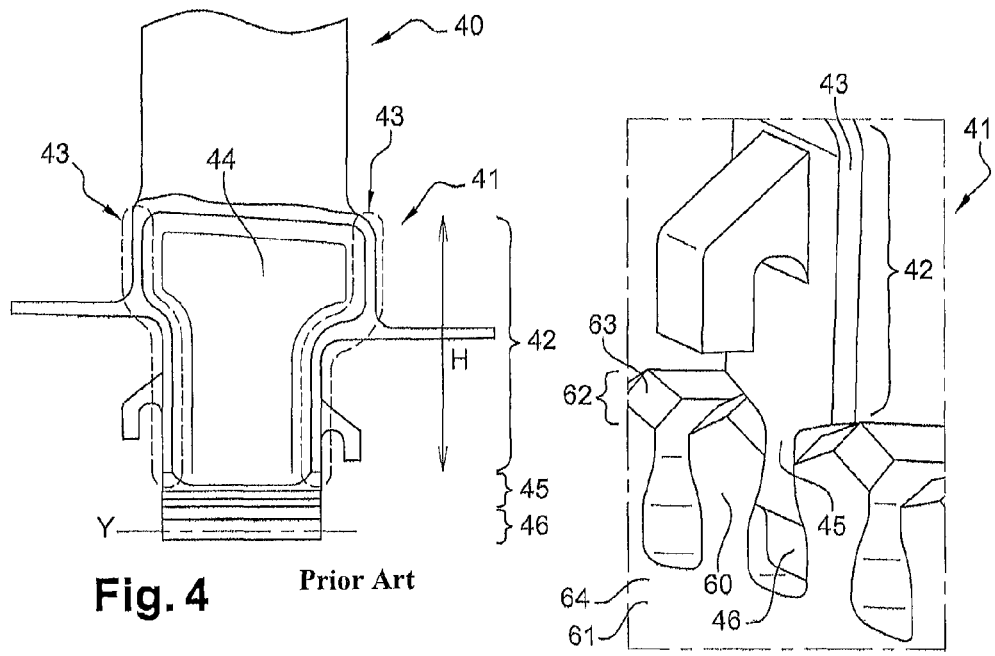
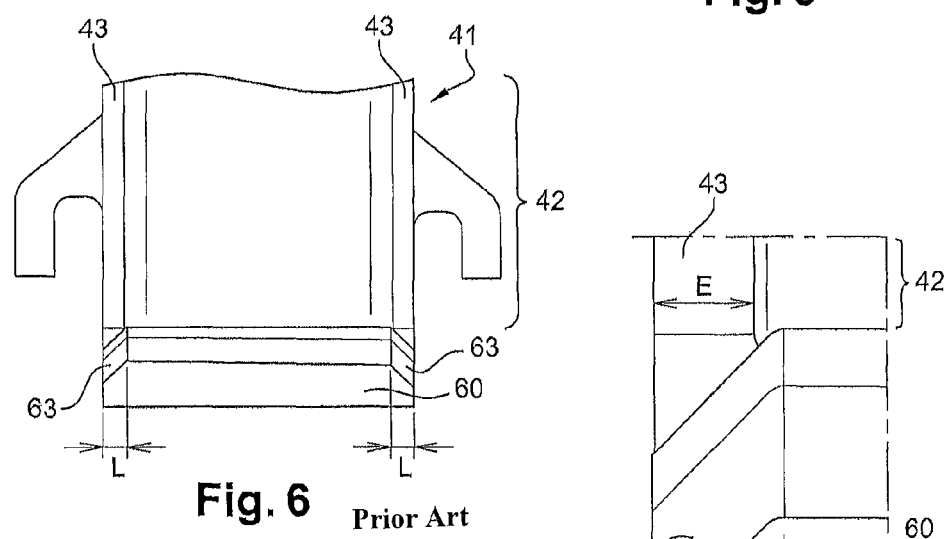

TURBOMACHINE VANE COOPERATING WITH A VANE RETENTION DISK

CROSS-REFERENCE TO RELATED APPLICATIONS

This application claims priority to French Patent Application No. 1353309, filed Apr. 11, 2013, the entire content of which is incorporated herein by reference in its entirety.

FIELD

The invention relates to the general field of turbomachines. It relates to turbomachine impellers and more particularly to the axial retention of vanes carried by impellers

BACKGROUND

A turbomachine impeller is comprised of a disk and movable vanes rotatably driven by the disk under the effect of a fluid flow from upstream to downstream through the turbomachine. It is noted that the terms "upstream" and "downstream" are to be considered with respect to a general flow direction of fluids through the turbomachine, from upstream to downstream.

FIG. 1 shows a first turbine vane 10 generally extending along a longitudinal axis X, and conventionally including a blade 11 the bent profile of which is adapted to the aerodynamic functions it should fulfil in operation. At both its side ends, the blade 11 includes a leading edge 12 and a trailing edge 13, between which extend an active surface wall 14 and a passive surface wall. In FIG. 1, only the active surface side of the first vane 10 is visible. The first vane 10 also includes a shank 15 projecting from the blade 11 along the longitudinal axis X, and extending between the leading edge 12 and the trailing edge 13.

For mounting vanes, the disk includes on its periphery a plurality of evenly distributed teeth, radially outwardly projecting from the disk and extending between both side faces of the disk along the axis of rotation of the disk. The teeth are evenly spaced from each other throughout the circumference of the disk. The spaces between two adjacent teeth bound sockets wherein the impeller vanes are engaged by their respective shanks, enabling the vanes to be radially held through positive connection.

More precisely, in reference to FIG. 2, the shank 15 of the first vane 10 of FIG. 1 successively includes along the longitudinal axis X of the vane, from the blade 11: a pole 16, a neck 17 and a bulb 18, which have planar side flanks 19. The bulb extends along a longitudinal axis Y, substantially perpendicular to the longitudinal axis X of the vane. When the first vane 10 is in position on the disk, these side flanks 19 are aligned with the side faces of the disk. The neck 17 and the bulb 18 have a cross-section corresponding to that of a socket so as to radially hold the first vane 10. Indeed, as seen from the leading edge 12 side as illustrated in FIG. 3, the neck 17 is characterised by a narrow area and the bulb 18 by a flared area, so as to radially retain the shank 15 in the socket.

Further, the pole 16 includes side walls 20 extending on most of the pole 16 along the longitudinal axis X, in a plane substantially orthogonal to the longitudinal axis Y of the bulb 18. The walls enable swinging of the first vane 10 towards the disk from the active surface towards the passive surface or reversely to be prevented. Hereinafter, the dimension of the walls 10 along the axial direction Y will be called thickness E.

In order to reduce the weight of the turbine impeller, it is proposed to reduce the disk diameter as well as the thickness of the walls of the vanes throughout their height. A lower portion of a second vane 40 according to this new configuration is illustrated in FIG. 4. The second vane 40 includes a shank 41 comprising a pole 42, a neck 45 and a bulb 46, the pole 42 including walls 43. FIG. 4 gives details about the shank 41. It is noted that the height H of the pole 42 is increased with respect to the first vane 10 of FIG. 1 in order to compensate for the reduction in diameter of the disk, and that the walls 43 are of lower thickness. The walls 43 define a first area 44 on the active surface side of the second vane 40 and a second area on the passive surface side of the second vane 40.

However, these modifications cause two problems:
  each tooth 60 of the disk 61 includes, at its top 62, that is in the area farthest from the axis of the disk 61, chamfers 61 located at the side faces 64 of the disk 61, as illustrated in FIG. 5. More precisely, each tooth 60 includes two chamfers 63 at each of the side faces 64 of the disk 61. Thereafter, in reference to FIG. 6, the dimension of the chamfer 63 along the leading edge/trailing edge direction will be called length L. But, since the walls 43 are of low thickness E, they can be supported on the teeth 60 only at the chamfer 63, that is be unstably supported. This situation occurs if the thickness E of the walls 43 is equal to or lower than the length L of the chamfers 63. A swing of the second vane 40 can then happen, upon mounting the second vane 40 onto the disk 61 or in operation. A magnification of the area of the chamfer of FIG. 6 is given in FIG. 7.
  The neck 45 has an overstress area, which decreases the robustness of the second vane 40.

SUMMARY

An aspect of the invention offers a solution to the previously discussed problems, by providing a robust vane having walls of low thickness, not having stability problems when it is held on the disk.

An aspect of the invention thus relates substantially to a turbomachine vane for cooperating with a vane retention disk including a plurality of peripheral teeth, the vane including a shank comprising:
  a neck and a bulb for cooperating with a socket of the disk so as to radially hold the shank in the socket, a socket being a space bounded by two successive teeth of the disk,
  a pole on top of the neck, including two side walls facing at least one vane side among the active surface side of the vane and the passive surface side of the vane, at least a wall having a rib at a lower end of the pole, the rib extending in the direction of the side wall associated with the wall and providing a function of holding the vane when the vane is retained in the disk.

By virtue of this aspect of the invention, when the vane is retained in the disk, the rib is supported on one of the teeth bounding the socket, and a portion other than the chamfer. This enables swinging of the vane to be avoided. Apart from the rib, the thickness of the wall is low to restrict the vane weight.

Besides the characteristics just discussed in the preceding paragraph, the vane according to an aspect of the invention can have one or more further characteristics among the following ones, considered singly or according to any technically possible combinations.

According to an embodiment, the holding function is provided by plane attachment between the rib and a portion of a tooth bounding the socket. The holding is thus optimum.

According to an embodiment, all the walls have a rib at a lower end of the pole. In other words, each wall has a rib at a lower end of the pole, the rib extending to the side wall facing said wall and providing a function of holding the vane when the vane is retained in the disk. The holding is thus optimum.

An aspect of the invention also relates to a vane impeller for a turbomachine such as previously described, and a vane retention disk including at least two peripheral teeth forming a socket cooperating with the neck and the bulb of the vane, at least one peripheral tooth comprising at least one chamfer at a side face of the disk, the thickness of the rib being higher than the length of the chamfer.

Another aspect of the invention also relates to a turbomachine including a vane impeller such as previously described.

BRIEF DESCRIPTION OF THE FIGURES

The figures are only given by way of indicating and in no way limiting purposes of the invention. The figures show:

in FIG. 1, already described, a schematic representation of a first low pressure turbine vane according to prior art, on the active surface side;

in FIG. 2, already described, a schematic representation of the shank of the first vane of FIG. 1, on the active surface side;

in FIG. 3, already described, a perspective view of a lower part of the shank of FIG. 2;

in FIG. 4, already described, a schematic representation of the shank of a second low pressure turbine vane according to prior art;

in FIG. 5, already described, a schematic representation of the shank of FIG. 4, held in a socket of a vane retention disk;

in FIG. 6, already described, a passive surface side view of FIG. 5;

in FIG. 7, already described, a magnification of a part of FIG. 6;

DETAILED DESCRIPTION

Figure 8:
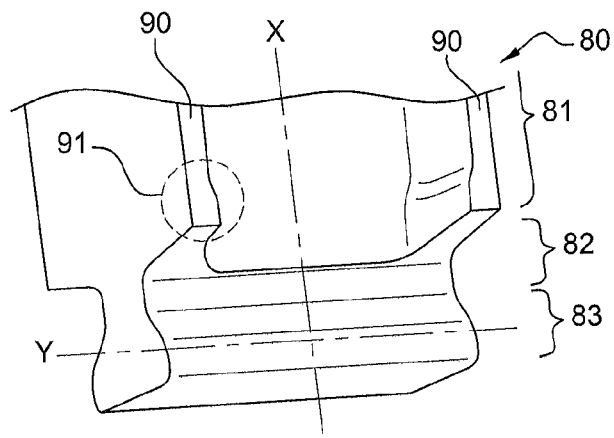
in FIG. 8, a schematic representation of a vane shank according to an embodiment of the invention.

Unless otherwise specified, a same element appearing on different figures has a single reference numeral. In the description, the terms lower and upper are to be understood along the orientation of the figures.

FIG. 8 represents an upper area of a shank 80 of an aircraft low pressure turbine vane extending along a longitudinal axis X, the shank 80 including:

a pole 81;

a neck 82 projecting from the pole 81;

a bulb 83 projecting from the neck 82, and extending along a longitudinal axis Y.

Figure 9:
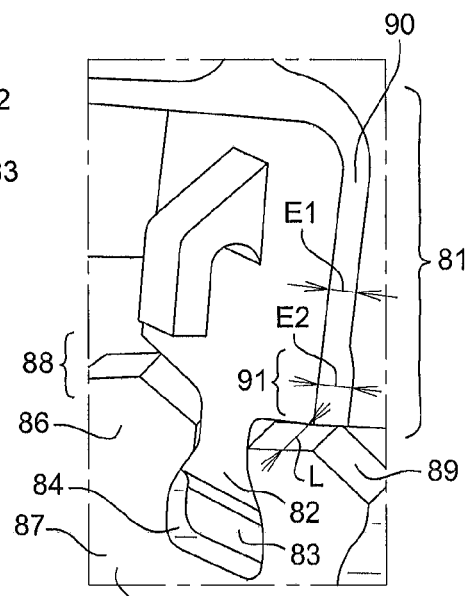
in FIG. 9, a schematic representation of the shank of FIG. 8, held in a socket of a vane retention disk.

As shown in FIG. 9, the neck 82 and the bulb 83 are for cooperating with a socket 84 of a vane retention disk 85. Indeed, the disk 85 includes on its periphery a plurality of evenly distributed teeth 86, radially outwardly projecting from the disk 85 and extending between both side faces 87 of the disk 85 along the axis of rotation of the disk 85. The teeth 86 are evenly spaced from each other throughout the circumference of the disk 85. The spaces between two adjacent teeth 85 bound sockets 84 wherein the vanes shanks are engaged, enabling the vanes to be radially held through positive connection.

Each tooth 86 of the disk 85 includes, at its top 88, that is in the area farthest from the axis of the disk 85, chamfers 89 located at the side faces 87 of the disk 85. More precisely, each tooth 86 includes two chamfers 89 at each of the side faces 87 of the disk 85. In the continuation of the description, in reference to FIG. 10, the dimension of a chamfer 89 along the leading edge/trailing edge direction is called length L.

On the other hand, the pole 81 includes two side walls 90 facing the active surface side of the vane, and two walls facing the passive surface side of the vane, the walls extending on most of the pole according to the longitudinal axis X, in a plane substantially orthogonal to the longitudinal axis Y of the bulb 83. It is noted that only the active surface side is visible in FIGS. 8, 9 and 10. In the continuation of the description, the dimension of the walls 90 along the axial dimension Y of the bulb 83 is called thickness E1.

In the embodiment described, each wall 90 includes a rib 91 at a lower end of the pole 81, the rib 91 extending to the side wall direction facing the wall 90. The lower end considered is the end located on the neck 82 side. In the continuation of the description, the thickness of the rib 91 is called E2.

Figure 10:
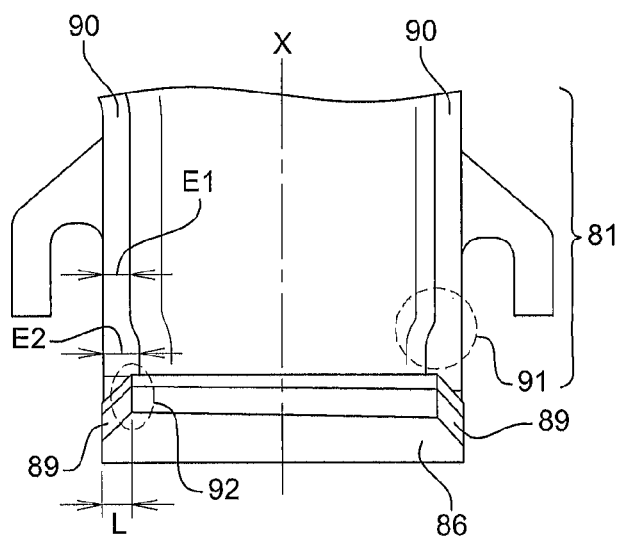
in FIG. 10, a passive surface side view of FIG. 9.
Figure 11:
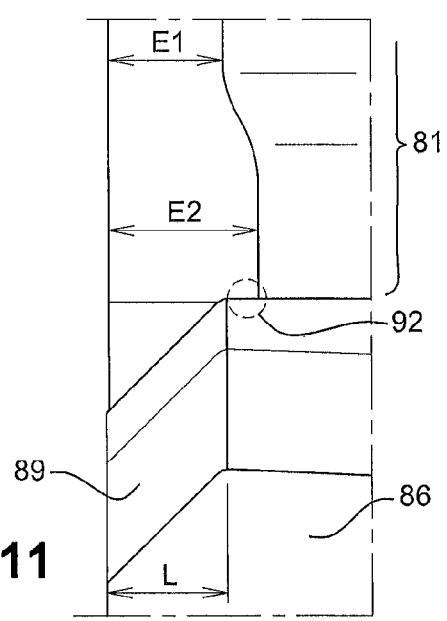
in FIG. 11, a magnification of a part of FIG. 10.

The thickness E2 of the rib 91 is higher than the length L of the chamfers 89, thus when the vane is retained in the disk 85, the rib 91 is supported on one of the teeth 86 bounding the socket 84, on a portion 92 other than the chamfer 89, as is visible in FIG. 10. This enables swinging of the vane from the active surface to the passive surface or reversely to be avoided. It is noted that in an embodiment, the thickness E1 of the wall 90 is lower than the length L of the chamfers 89 to restrict the vane weight. For a better understanding, a magnification of the area of the chamfer 89 of FIG. 10 is given in FIG. 11.

The invention claimed is:

1. A turbomachine vane constructed to cooperate with a socket of a vane retention disk including a plurality of peripheral teeth, said socket being a space bounded by two successive peripheral teeth of the vane retention disk, said turbomachine vane including a blade extending along a longitudinal direction and a shank projecting at an end of said blade, said shank comprising:

a neck and a bulb constructed to cooperate with the socket of the disk so as to radially hold said shank in said socket;

a pole on top of said neck, said pole including first and second opposite vertical side walls facing each other and arranged on an active surface side of the turbomachine vane and third and fourth opposite vertical side walls facing each other and arranged on a passive surface side of the turbomachine vane, each of the first, second, third and fourth opposite vertical side walls having a length along said longitudinal direction that is greater than a combined length of said neck and bulb along said longitudinal direction, each side wall of the first, second, third and fourth opposite side walls having a rib at a lower end of the pole, said rib extending toward the opposite side wall facing said side wall and providing a function of holding the turbomachine vane when said turbomachine vane is retained in the vane retention disk.

2. A vane impeller for a turbomachine, the vane impeller comprising:
   a vane retention disk including a first main face, a second main face opposite said first main face and a plurality of peripheral teeth provided at a periphery of the vane retention disk, at least two successive peripheral teeth of the plurality of peripheral teeth forming a socket, and
   a turbomachine vane constructed to cooperate with said socket, said turbomachine vane including a blade extending along a longitudinal direction and a shank projecting at an end of said blade, said shank comprising
      a neck and a bulb constructed to cooperate with the socket of the turbomachine vane retention disk so as to radially hold said shank in said socket,
      a pole on top of said neck, said pole including first and second opposite vertical side walls facing each other and arranged on an active surface side of the turbomachine vane and third and fourth opposite vertical side walls facing each other and arranged on a passive surface side of the turbomachine vane,
      each vertical side wall of the first, second, third and fourth opposite vertical side walls having a rib at a lower end of the pole, said rib extending toward the opposite vertical side wall facing said vertical side wall to retain the turbomachine vane in the vane retention disk,
   wherein at least one peripheral tooth of the two successive peripheral teeth comprises at least one chamfer formed on the first or second main face of the vane retention disk, wherein a thickness of the rib is larger than the length of the at least one chamfer measured along a direction perpendicular to the first and second main faces.

3. The vane impeller according to claim 2, wherein the turbomachine vane is retained in the vane retention disk by plane attachment between the rib and a portion of a tooth bounding the socket.

4. A turbomachine including a vane impeller according to claim 2.

5. The vane impeller according to claim 2, wherein each of the first, second, third and fourth opposite vertical side walls have a length along said longitudinal direction that is greater than a combined length of said neck and bulb along said longitudinal direction.

6. The vane impeller according to claim 2, wherein a thickness of the side wall above the rib is smaller than the length of the at least one chamber.

\* \* \* \* \*